United States Patent
Newbury et al.

(10) Patent No.: US 10,187,838 B2
(45) Date of Patent: Jan. 22, 2019

(54) SYSTEM AND METHOD FOR LOAD REBALANCING

(71) Applicant: Futurewei Technologies, Inc., Plano, TX (US)

(72) Inventors: Mark Ernest Newbury, Hillsborough, NJ (US); Keith Butterworth, Bedminster, NJ (US); Zinan Lin, Basking Ridge, NJ (US); Alpaslan Gence Savas, Summit, NJ (US); Matthijs A. Visser, Mendham, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 64 days.

(21) Appl. No.: 14/931,306

(22) Filed: Nov. 3, 2015

(65) Prior Publication Data

US 2017/0127327 A1 May 4, 2017

(51) Int. Cl.
| | |
|---|---|
| *H04W 36/22* | (2009.01) |
| *H04W 28/08* | (2009.01) |
| *H04W 72/04* | (2009.01) |
| *H04W 24/00* | (2009.01) |
| *H04W 36/06* | (2009.01) |

(52) U.S. Cl.
CPC ......... *H04W 36/22* (2013.01); *H04W 24/00* (2013.01); *H04W 28/085* (2013.01); *H04W 72/0453* (2013.01); *H04W 36/06* (2013.01)

(58) Field of Classification Search
CPC ..... H04W 88/06; H04W 28/08; H04W 28/02; H04W 28/0205; H04W 28/0268; H04W 28/06; H04W 28/085; H04W 36/22; H04W 36/0083; H04W 24/02; H04W 84/12; H04W 36/30; H04W 52/343
See application file for complete search history.

(56) References Cited

U.S. PATENT DOCUMENTS

| | | | | |
|---|---|---|---|---|
| 8,929,234 | B1 * | 1/2015 | Vivanco | H04W 28/08 370/252 |
| 2005/0265283 | A1 * | 12/2005 | Qi | H04W 36/22 370/331 |
| 2006/0166677 | A1 | 7/2006 | Derakshan et al. | |
| 2009/0245207 | A1 * | 10/2009 | Rao | H04W 36/04 370/332 |
| 2010/0085884 | A1 | 4/2010 | Srinivasan et al. | |
| 2010/0246399 | A1 * | 9/2010 | Abraham | H04W 72/0453 370/235 |

(Continued)

FOREIGN PATENT DOCUMENTS

| | | |
|---|---|---|
| CN | 104159234 | 11/2014 |
| CN | 104685939 A | 6/2015 |
| EP | 2833672 A1 | 2/2015 |

*Primary Examiner* — Peter Chen
(74) *Attorney, Agent, or Firm* — Slater Matsil, LLP

(57) ABSTRACT

A system and method for load rebalancing are provided. A node B selects a subset of carriers from a plurality of carriers of the node B according to effective usages for the plurality of carriers, determines a heavily loaded carrier and a lightly loaded carrier from the subset of carriers according to effective usages of the subset of carriers, select a mobile device assigned to the heavily loaded carrier as a candidate for handoff, and performs a handoff of the selected mobile device from the heavily loaded carrier to the lightly loaded carrier.

21 Claims, 7 Drawing Sheets

(56) References Cited

U.S. PATENT DOCUMENTS

| | | | |
|---|---|---|---|
| 2012/0155272 A1* | 6/2012 | Quan | H04L 5/003 370/235 |
| 2013/0279334 A1 | 10/2013 | Xu et al. | |
| 2013/0286830 A1 | 10/2013 | Xu et al. | |
| 2016/0044538 A1* | 2/2016 | Aksu | H04W 28/085 370/235 |
| 2016/0119813 A1* | 4/2016 | Sridhar | H04W 28/0268 370/229 |

* cited by examiner

SYSTEM AND METHOD FOR LOAD REBALANCING

TECHNICAL FIELD

The present invention relates generally to wireless communications, and in particular embodiments, to techniques and mechanisms for load rebalancing in a wireless communications network.

BACKGROUND

A mobile device accessing a wireless network typically has a choice of several carriers (i.e., several frequency channels) on a node B in which to place its call. A static load balancing may be defined as a network strategy for choosing the best carrier on the node B to initially host a call. For example, a mobile device may be directed to a carrier with the lightest load. Since criteria used to choose a carrier for a mobile device may change with time, dynamic load balancing may be employed to move an in-progress call to a better carrier. For example, a carrier initially chosen for a mobile device may become overloaded with time. The mobile device may then be moved to a carrier with a lighter load while its call is in progress.

Proper distribution of loads amongst carriers is becoming increasingly important and complex. Wireless networks continue to accommodate explosive growth by adding more spectrum (i.e., more carriers), which increases the allowed carrier choices as well as the opportunity for generally optimizing or improving performance. In addition, spectrum allocations within a market continue to be spread amongst widely disparate frequency bands. The carriers available for choice are therefore spread across multiple bands, with significantly different radio channel characteristics. These differences must be considered in any strategy that aims to balance load distribution amongst carriers. For example, moving a mobile device to a new (or target) carrier with lighter load may not be the best solution if the mobile device will experience a poor channel condition on the new carrier.

Strategies for distributing loads among carriers vary within the industry. Many service providers pursue static load balancing only, as the cost of dynamic load balancing is viewed as high when compared with potential performance benefit. For example, the cost of dynamic load balancing may include computational burden of selecting which mobile devices to move, as well as possible performance degradations associated with moving or "handing off" calls between carriers. These degradations may include call drop, longer latency, reduced throughput, and increased channel error.

In some cases, static load balancing may be employed and followed with dynamic load balancing, where dynamic load balancing is typically executed by attempting to find and enforce generally a net optimal load distribution for current calls. Such a load distribution may be an "end-state" that is determined based on several factors, which may include the load and radio characteristics of each carrier. Other factors such as service priorities may also be considered when determining such an end-state. For example, a service provider may favor or prioritize certain carriers for specific types of traffic, e.g., carrier N will handle voice traffic only. As soon as a desirable end-state is computed, the total load may be placed in (or moved towards) this end-state by executing one or more handoffs between carriers (which is referred to as "inter-carrier handoffs"). End-state computation and subsequent execution of handoffs may be based on a trigger that indicates some unbalance of load between carriers, e.g., unequal number of users, or unequal cell transmit power, etc. Computation of an "optimal" end-state may be computationally complex and expensive. For instance, each mobile may need to measure (which is a computation cost) and report (which is a signal overhead cost) radio channel conditions at its location for a number of candidate target carriers in order for the network to compute an optimal solution. These computation and overhead costs add to the other costs (e.g., risk of call drop in an inter-carrier handoff) of dynamic load balancing.

Although specific strategies vary, a common "optimal" end-state may be a load distribution among carriers where the number of users per carrier is equalized. The associated computation costs are minimal and execution of handoff is straightforward. However, this strategy ignores the potentially wide variation in performance of users spread across carriers. As a simple example, for a total of 6 users spread equally across two carriers, there are 20 distinct load distribution solutions allowing 3 users on each carrier. Conventionally, a strategy that targets only equal users per carrier views each of these solutions as equally valid. However, each of the solutions actually results in different carrier performance. For example, the net performance of a solution with users 1, 2, and 3 on carrier A and with users 4, 5, and 6 on carrier B is not the same as that with users 1, 4, and 5 on carrier A and 2, 3, and 6 on carrier B.

A more complex but less common method may attempt to ensure that users close to a cell site (which may be referred to as "near" users) are placed on carrier(s) with higher frequencies, and users far from the cell site (which may be referred to as "far" or "edge" users) are placed on carrier(s) with lower frequencies. This method is based on radio physics that dictate higher signal loss with distance at higher frequencies and lower signal loss with distance at lower frequencies. An end-state in this method thus places far users (i.e., users at greatest distance from the cell site) at a frequency where the radio signals will suffer the least loss over distance. This method attempts to achieve a better performance at the cost of additional complexity resulted from, e.g., the need to identify a boundary between "near" and "far", and the need to collect and process measurements of radio conditions at current and target carriers for each user equipment (UE). Moreover, the cost of multiple handoffs is not contained and performance is only considered indirectly via the (poor) proxy of radio signal strength.

SUMMARY OF THE INVENTION

Technical advantages are generally achieved, by embodiments of this disclosure which describe a system and method for load rebalancing.

In accordance with an embodiment, a method is provided which includes selecting, by a node B, a subset of carriers from a plurality of carriers of the node B according to effective usages of the plurality of carriers. The subset of carriers includes at least two carriers each of which has an effective usage greater than a usage threshold. An effective usage of a respective carrier in the plurality of carriers is obtained according to a measured usage of the respective carrier and a relationship between carrier performance and carrier usages. The method also includes determining, by the node B, a heavily loaded carrier and a lightly loaded carrier from the subset of carriers according to the effective usages for the subset of carriers, and selecting, by the node B, a mobile device assigned to the heavily loaded carrier as a candidate for handoff when a criteria is satisfied. The method further includes performing, by the node B, a handoff of the selected mobile device from the heavily loaded carrier to the lightly loaded carrier. A node B for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different Figures generally refer to corresponding parts unless otherwise indicated. The Figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1A:
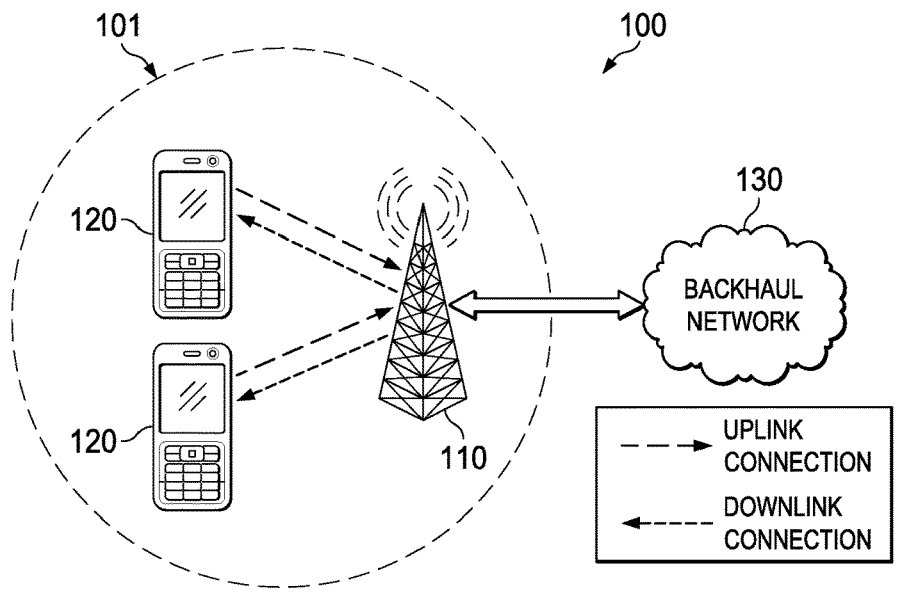
FIG. 1A illustrates a block diagram of an embodiment wireless communications network.

Aspects of the present disclosure provide a method for load rebalancing among a plurality of carriers of a node B in a wireless communications network. The load rebalancing method bypasses the high costs of potential performance degradation, computational complexity, and signal overhead by incrementally and iteratively moving user equipment (UE) between carriers when sufficient load imbalance between the carriers is detected. In accordance with some embodiments, a mobile device whose inter-carrier handoff that may generally optimally benefit the statistical performance distribution across all user equipment may be selected and moved to a target carrier, thus rebalancing the load among the carriers. After rebalancing the load, the performance of the network may be evaluated, and the method of the load rebalancing may be repeated. base station FIG. 1A illustrates a network 100 for communicating data. The network 100 comprises a node B 110 having a coverage area 101, a plurality of mobile devices 120, and a backhaul network 130. As shown, the node B 110 establishes uplink (dashed line) and/or downlink (dotted line) connections with the mobile devices 120, which serve to carry data from the mobile devices 120 to the node B 110 and vice-versa. Data carried over the uplink/downlink connections may include data communicated between the mobile devices 120, as well as data communicated to/from a remote-end (not shown) by way of the backhaul network 130. As used herein, the term "node B" refers to any component (or collection of components) configured to provide wireless access to a network, such as an enhanced base station (eNB), base station, a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a node B, such as a user equipment (UE), a mobile station (STA), and other wirelessly enabled devices. In some embodiments, the network 100 may comprise various other wireless devices, such as relays, low power nodes, etc.

In accordance with some embodiments, a load or usage of each of the carriers within a node B may be evaluated in a measurement interval, and a subset of all of the carriers of the node B may be selected for further evaluation. This subset may include two or more carriers whose usage exceeds a preset threshold, which may be referred to as a usage threshold. In one embodiment, each of the carriers may have a different threshold that is specific to the respective carriers, and the threshold may be adjustable by a service provider. Alternatively, a same threshold may be used for all the carriers. Throughout this disclosure, the terms of "load" and "usage" are used interchangeably, and the terms of "carrier" and "channel" are used interchangeably.

One of ordinary skill in the art would recognize many variations, alternatives and modifications for measures of usage of a carrier. One of ordinary skill in the art would also recognize that any measure of usage may be further refined based on scenarios or services and be employed. In the following description, a usage may be viewed as a per-carrier metric of long term evolution (LTE) resource block (RB) usage, only for the purpose of illustration in this disclosure, and should not be construed to be limiting to the scope of the claims. One of ordinary skill in the art would recognize that other measures, or combinations of measures, may also be employed and are equally applicable in the discussion that follows.

Figure 1B:
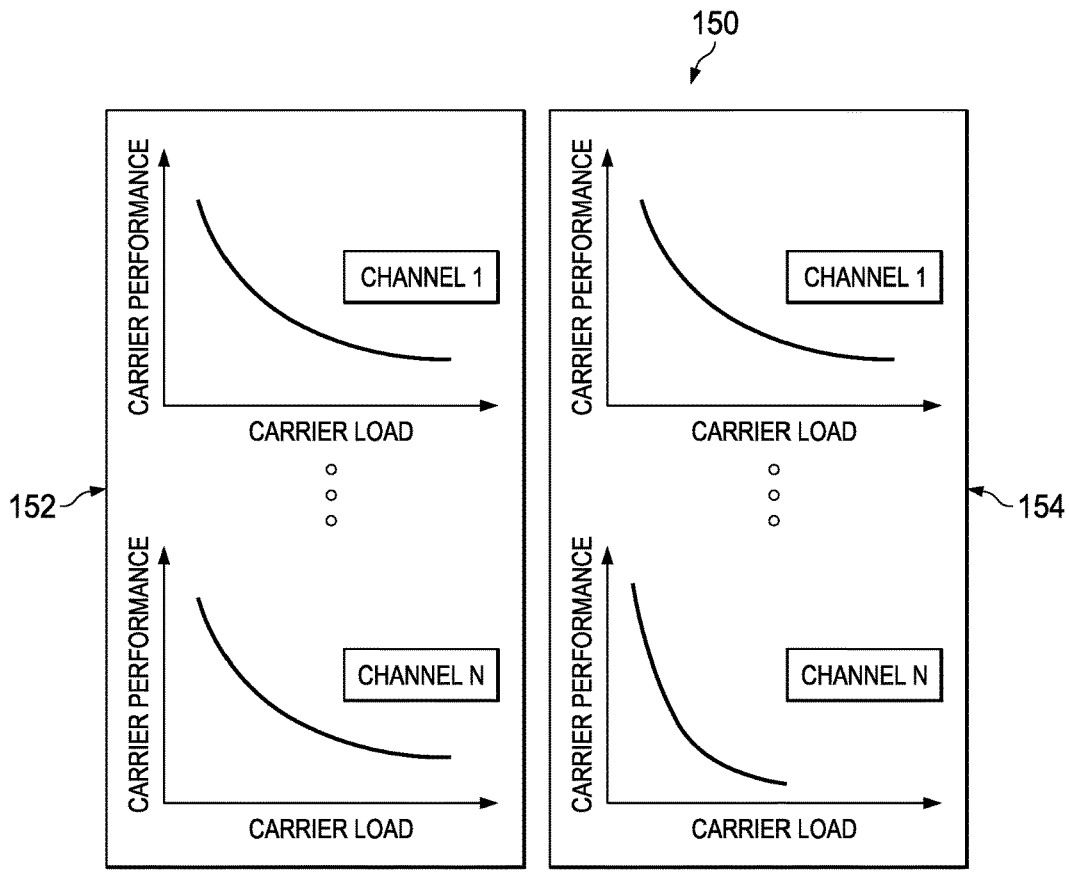
FIG. 1B illustrates graphs of embodiment carrier performance varying with load.

A usage of a carrier may be obtained by measuring the usage of the carrier, which may be referred to as a measured usage of the carrier, and may be used to select a subset of carriers from a plurality of carriers on a node B. In accordance with some embodiments, an effective usage of each of the carriers, rather than a measured usage, is used when selecting the subset. The effective usage of a carrier is a measured usage of the carrier adjusted by a factor that reflects impact of the measured usage on performance of the carrier, or reflects the carrier's specific sensitivity to (or specific performance degradation by) usage. In one embodiment, an effective usage of a carrier may be obtained according to a measured usage of the carrier and a nonlinearity relationship between carrier performance and carrier usages. A load or usage of a carrier is highly correlated with carrier performance. Field observations of wireless networks show that carrier performance typically degrades nonlinearly with carrier load or carrier usages, and this degradation or relationship between carrier performance and carrier usages is unique to each carrier. FIG. 1B illustrates graphs 150 of embodiment carrier performance varying with carrier usages or load for different channels (or carriers) 1 to N. FIG. 1B illustrates multiple graphs 152 with each including a performance curve for a carrier. Each of the performance curves represents a relationship between carrier performance and carrier usages of a specific carrier. As shown by the performance curves in graphs 152, channels 1 to N have the same carrier nonlinearities, or the same degradation of performance with load. In accordance with some embodiments, different channels may have different carrier nonlinearities, which are shown by graphs 154, where channel N is shown to be more sensitive to its load than channel 1. Each of the curves illustrated in FIG. 1B may be referred to as a nonlinear performance vs. usage curve of a carrier, a load curve or a performance curve of a carrier.

In accordance with some embodiments, for N carriers on a node B with each carrier having a corresponding performance curve available, an effective usage of each of the N carriers corresponding to its respective measured usage may be obtained by use of the following Algorithm 1:

Let x=carrier usages

Let $p_i(x)$=performance curve of ith carrier at x

Let $p_i^{-1}(x)$=inverse function of $p_i(x)$

Let $p_W(x)$=reference ("worst") nonlinearity curve amongst all carriers

Let $x_1, \ldots x_N$ be measured usage of carrier 1, ... carrier N

Let $x_{1\mathit{eff}}, \ldots x_{N\mathit{eff}}$ be effective usage of carrier 1, ... carrier N Effective usage carrier i is then:

$$p_W(x_{i\mathit{eff}})=p_i(x_i) \text{ or } x_{i\mathit{eff}}=p_W^{-1}[p_i(x_i)]$$

The reference curve $p_W$ as shown in the Algorithm 1 above may be generated for the N carriers by constructing a single performance curve, i.e., a single nonlinear performance vs. usage curve, which satisfies $p_W(x) \leq p_i(x)$ for all x and i. That is, the reference curve $p_W$ is formed by points from the performance curves of the N carriers, where each of the points has the worst performance across all the N carriers with respect to a particular usage. Thus, the reference curve represents the worst performance scenario for all possible loads across all the N carriers. If none of the N performance curves intersect, the reference curve for the N carriers may be one of the N performance curves that has the worst nonlinearity, or worst degradation of performance.

Figure 2A:
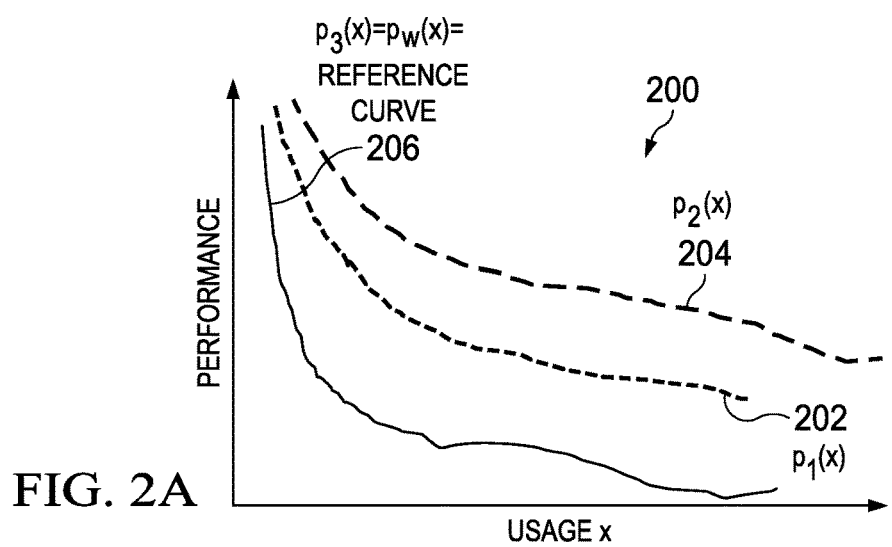
FIG. 2A illustrates a graph of embodiment performance curves for carriers on a node B.

FIG. 2A illustrates a graph 200 of embodiment performance curves for three carriers on a node B. The horizontal axis of the graph 200 represents carrier usage and the vertical axis represents carrier performance. Curves 202, 204 and 206 represent performance curves of carriers 1, 2 and 3, respectively. In this example, curves 202, 204 and 206 don't intersect with each other, and the curve 206 for the carrier 3 shows the worst degradation of performance with load and is selected as the reference curve.

Figure 2B:
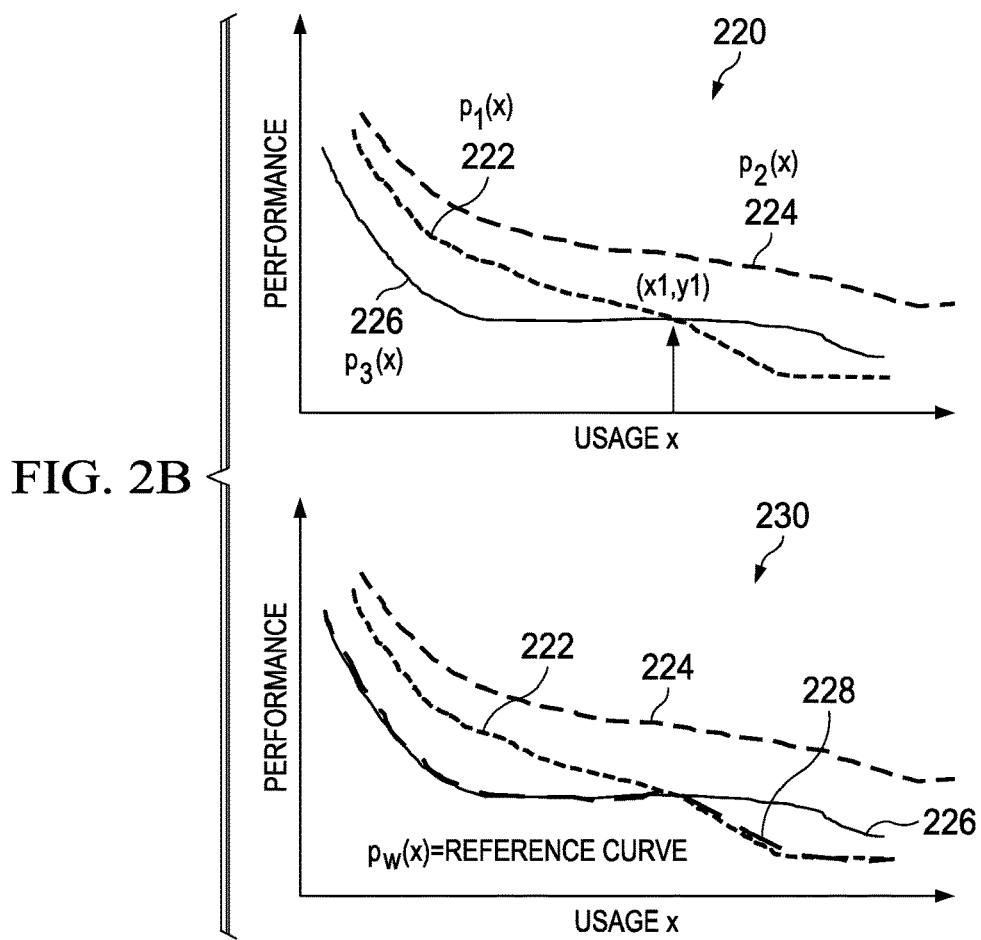
FIG. 2B illustrates a graph of another embodiment performance curves for carriers on a node B.

FIG. 2B illustrates a graph 220 of embodiment performance curves for three carriers. The horizontal axis of the graph 220 represents carrier usage and the vertical axis represents carrier performance. Curves 222, 224 and 226 represent performance curves of carriers 1, 2 and 3, respectively. Curves 222 and 226 intersect at a point (x1, y1). In this example, a reference curve for the three carriers may be generated according to the Algorithm 1 described above, and the reference curve satisfies $p_W(x) \leq p_i(x)$ for all usage x and all the three carriers. The reference curve generated in this example is shown by a curve 228 in a graph 230, which is a reproduction of the graph 200. As shown, the reference curve 228, which is a black dashed line, is constructed with a segment of the curve 222 and a segment of the curve 226.

Figure 3A:
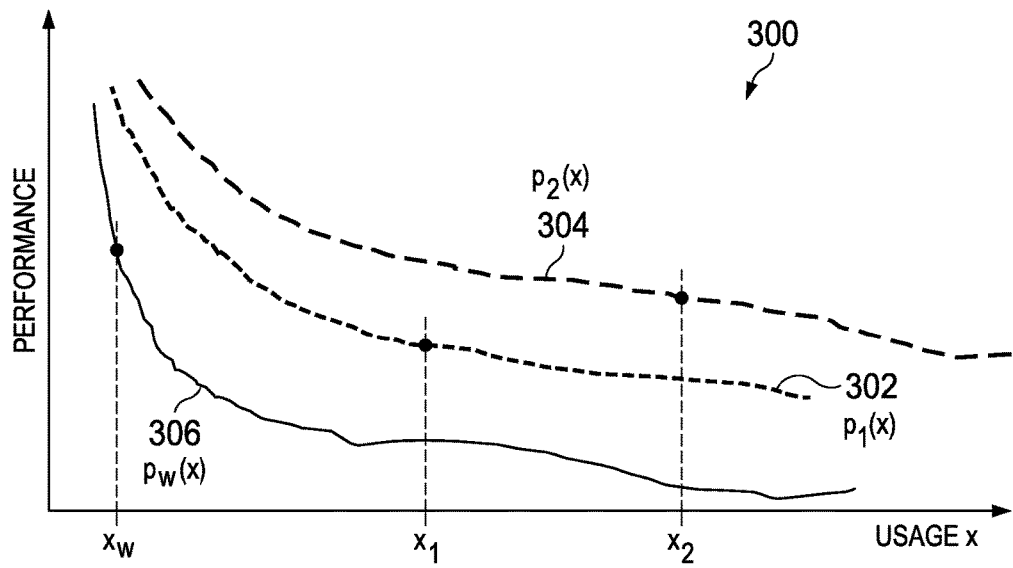
FIG. 3A illustrates a graph of embodiment performance curves of carriers and a reference curve for the carriers.
Figure 3B:
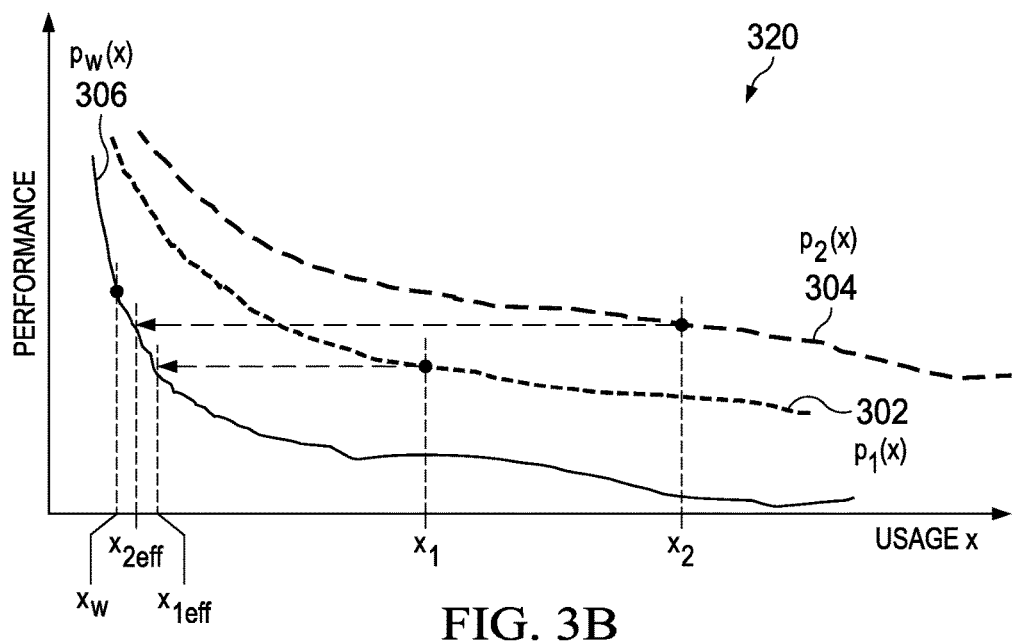
FIG. 3B illustrates a graph of embodiment performance curves of carriers and effective usages of the carriers.

FIG. 3A illustrates a graph 300 of embodiment performance curves of three carriers. Similar to FIGS. 2A and 2B, the horizontal axis of the graph 300 represents carrier usages and the vertical axis represents carrier performance. Curves 302, 304 and 306 represent performance curves of carrier 1, 2 and 3, respectively. The curves 302, 304 and 306 do not intersect with each, and thus one of the performance curves of the three carriers with the worst carrier performance is selected as a reference curve for the three carriers, i.e., curve 306 is selected as the reference curve $p_W(x)$. With a reference curve established, a load of a carrier may be adjusted to an effective load. In one embodiment, carrier 1 has a measured usage $x_1$, carrier 2 has a measured usage $x_2$, and carrier 3 has a measured usage $x_W$. The measured usages satisfies $x_2 > x_1 > x_W$, thus carrier 2 has the highest measured usage. However, the performance curves for each of the three carriers indicate that although carrier 2 has the highest load, the impact of the load $x_2$ on its performance is not as high as that of load $x_1$ on carrier 1, since carrier 2 has a higher performance at load $x_2$ than carrier 1 at load $x_1$. This impact of a load of a carrier on the performance of the carrier may be captured by computing and comparing an effective usage of a carrier with respect to a reference curve. FIG. 3B illustrates a graph 320 including the same performance curves 302, 304 and 306 as shown in FIG. 3A. FIG. 3B further illustrates an effective usage $x_{1\mathit{eff}}$, $x_{2\mathit{eff}}$ and $X_{2\mathit{eff}}$ (which is $x_W$) corresponding to the measured usage $x_1$, $x_2$ and $x_W$ of the three carriers, respectively. In one embodiment, an effective usage corresponding to a measured usage of a carrier may be computed by normalizing the measured usage to a reference curve of the carrier. For example, as shown in FIG. 3B, an effective usage corresponding to the measured usage $x_1$ for carrier 1 may be determined by looking at a point on the reference curve 306 where the point has the same performance as that corresponding to the measured usage $x_1$ on the curve 302. Since the performance curve of carrier 3 is the same as the reference curve, the effective usage of the carrier 3 remains the same as its measured usage $x_W$. The effective usages of the three carriers satisfies $x_{1\mathit{eff}} > x_{2\mathit{eff}} > x_W$, which indicate that carrier 1 is (effectively) most heavily loaded among the three carriers as its specific load results in the worst performance.

In accordance with some embodiments, the performance curves p(x) for carriers within a node B used for generating a reference curve and determining effective usages for the carriers may be obtained by a wireless communications network via direct observation of performance measures and usage measures over time, and may be regularly updated with new information. The term "performance" in this disclosure may refer to the use of any applicable performance measures, such as call retainability, call accessibility, call throughput, or any weighted combination of several such measures. Determination of which performance measure is to be used may be made by a service provider, depending upon its view of the relative importance of the available performance measures in ensuring customer experience. In accordance with some embodiments, when performance curves for all carriers within a node B are not available, embodiments of the present disclosure may proceed on an assumption that performance curves of all the carriers are identical, and thus the effective usage for each of the carriers is equal to the measured usage of the respective carriers. As discussed above, a subset of carriers may be selected from all the carriers within a node B, and the subset includes a plurality of carriers each of which has an effective usage greater than a threshold. For example, a node B may measure the usage for each of the carriers of a node B in a measurement interval, and determine an effective usage corresponding to a measured usage of each of the carriers. The node B may then determine whether each of the carriers has an effective usage greater than a usage threshold. If the effective usage of a carrier is greater than a usage threshold, the carrier will be selected into the subset. As discussed, the effective usage of a carrier may be compared to a usage threshold specific to the carrier, and each carrier may have a different usage threshold for the generation of the subset.

In accordance with some embodiments, after the subset of carriers is selected, a heavily loaded carrier (i.e., carrier H) and a lightly loaded carrier (i.e., carrier L) may be identified or determined from the subset, and a mobile device from the carrier H may be moved to the carrier L for rebalancing the load among all the carriers of the node B. In one embodiment, a heavily loaded carrier may be the most heavily loaded carrier among the subset of carriers. In another embodiment, a lightly loaded carrier may be the most lightly loaded carrier among the subset of carriers. One of an ordinary skill in the art may recognize many variations, alternatives and modifications for defining a heavily loaded carrier, and a lightly loaded carrier. In the following embodiments, the most heavily loaded carrier and the most lightly loaded carrier will be used as a carrier H and a carrier L, which is only for illustrative purpose and should not limit the scope of the claims. In one embodiment, effective usage rather than measured usage may be used to identify a carrier H and a carrier L. In one embodiment, the carrier H may be a carrier that has the highest effective usage. For identification of the carrier L, a combination of measured usage and local nonlinearity (i.e., local sharpness of the performance curve) of each carrier may be employed in order to incorporate the carrier-specific performance impact caused by added load into the determination of a carrier L. In one embodiment, a carrier L may be selected by any variant of the following Algorithm 2:

Let x=carrier usages
Let $p_i(x)$=performance curve of ith carrier @ x
Let $p_L(x)$=performance curve of carrier L
Let $x_1, \ldots x_N$ be measured usage of carrier 1, ... carrier N
Let $X_L$ be measured usage of carrier L
Let $dx_L$ be added load to L of a new Single UE moved from H to L
Let $dx_i$ be added load to carrier i of a new Single UE moved from H to carrier i
Carrier L satisfies:

$$p_L(x_L) - p_i(x_i) \geq \frac{dp_i}{dx}(x_i)dx_i - \frac{dp_L}{dx}(x_L)dx_L$$

The most lightly loaded carrier in this example represents a carrier in which introducing an added load causes the least impact on its carrier performance among all the carriers, or a carrier whose carrier performance has the least degradation with the added load among all the carriers. The Algorithm 2 above is an example for illustrative purpose only, and one of ordinary skill in the art would recognize many variations, alternatives and modifications for defining and/or determining a most lightly loaded carrier. The local slopes (i.e., derivatives) of the performance curves may be available from a wireless communications network as a part of performance observations and may be regularly updated if desired. The value of dx may be set by a service provider based upon observation of the performance vs. load curves across the carriers of a node B. In one embodiment, the value dx may be set to be the same across all carriers. Alternatively, the value dx may be set on a per-carrier basis.

In some embodiments, after selection of the carrier H and carrier L, the effective usage of each of the carrier H and carrier L is examined. If the difference in the effective usage between the carrier H and carrier L does not exceed a threshold, then no load rebalancing is performed, and embodiments of the present disclosure proceed to a next measurement interval for selecting another subset of carriers. The threshold may be adjustable by a service provider.

If the difference in the effective usage between the carrier H and carrier L exceeds the threshold, in one embodiment, mobile devices on the most heavily loaded carrier (i.e., carrier H) may be evaluated and one of the mobile devices may be selected to be a candidate for movement (i.e., handover) from the carrier H to carrier L. In accordance with some embodiments, selection of such a mobile device may be based upon evaluation of a function of device path loss and/or of difference in (effective) load between the carrier H and carrier L. In some other embodiments, a candidate device may be selected based on other factors determined by a service provider. In one embodiment, a mobile device may be selected based upon path loss only. For example, a mobile device that has the greatest path loss (i.e., propagation loss) to the host node B (i.e., a host cell site) may be selected as a candidate to move from the carrier H to the carrier L to rebalance the load of all carriers of the host node B. One of ordinary skill in the art would recognize that the path loss of a mobile device may be measured and reported in many different ways. For example, a device may report back the received signal strength of a pilot or control signal of known strength radiated from the node B. The mobile device's path loss may be checked against a path loss range defined by an upper bound PLmax and a lower bound PLmin. If the path loss does not fall within the path loss range or between the upper and lower bounds, the device is excluded as a candidate for action, and a device with the next greatest path loss may be considered and checked. If no mobile device on the carrier H falls within the path loss range, the node B will take no action to rebalance the load, i.e., the node B does not perform handoff of any mobile device from the carrier H, and will proceed to the next measurement interval to select a new subset of carriers for load rebalancing. In the present disclosure, the terms "mobile device" and "device" are used interchangeably, and the terms "move" and "handover" or "handoff" are used interchangeably.

The upper bound and the lower bound may be adjustable thresholds set by a service provider. The upper bound and the lower bound, which may be referred to as a path loss bound pair, may be unique to each specific carrier pair that may be under consideration as a carrier H and a carrier L. In one embodiment, the purpose of setting the lower bound is to ensure that any device considered for move be not too "close" to the host node B. For example, it is possible that a load on carrier H is very heavy and that all users on carrier H are tightly clustered together near the cell site. In this case, moving a device on carrier H with the greatest path loss may have marginal benefit. In one embodiment, the purpose of setting the upper bound is to ensure that any device considered for move is not too "far" from the host node B. If a device to be moved is too far, probability of a failed handover of the device to the "target" carrier L may rise.

The above example of choosing a device with highest path loss for handover from the carrier H to the carrier L is for illustration only, and should not be construed to limit the scope of claims. A variety of other useful functions based upon path loss as well as (effective) load differences between the carrier H and carrier L may also be used in selecting a mobile device for handover. In all these cases, the bounds PLmax and PLmin may still apply but may be adjusted accordingly.

In accordance with some embodiments, each of the mobile devices hosted by a carrier may be assigned a priority value P, and the priority of mobile devices on a carrier H may be considered in selecting a device for handover. The priority P of a device may be a function of one or more available parameters relevant to device history (past), device performance, device future, node B/sector performance, and network performance. In one embodiment, the priority P of a device may be calculated as a function of download history, data waiting in buffer, and a measure of user experience (e.g., data rate) of the device, which may be expressed as: $P=P(x1,x2,x3)=(w2 *x2)/(w1*x1+w3*x3)$, where $x1$ is the total bits already delivered over a defined past time interval (or history), $x2$ is the total bits waiting in buffer to be delivered in a defined future time interval (or future), and $x3$ is the user experienced data rate (e.g., total bits delivered per user total wait time) over a defined past time interval. The total bits delivered and the defined past time interval may or may not be the same as that associated with $x1$. The $w1$, $w2$, and $w3$ are weighting factors and may be selectable or adjustable.

In an example of $P=x2/(x1+k*x3)$, $x2$ may represent the total bits scheduled for delivery for a device. If $x2$ is larger, the device may be set to have a higher priority; otherwise, if $x2$ is smaller or is zero, the device may be set to have a smaller priority, i.e., its movement is likely to be of less benefit if it will not be placing any load on a carrier to which it is to be moved. For two devices with comparable $x2$, lower priority may be assigned to a device with a better history (e.g., larger $x1$) and/or a better user experience (i.e., $k*x3$). The example for calculating a priority is for illustrative purpose only and should not be construed as limiting the definition of the priority P. Any function based on parameters capturing device past, device future, user experience, as well as node, sector, and network performance may be used within the embodiments of the present disclosure.

In accordance with some embodiments, when a candidate device is selected according to evaluation of a function of device path loss and/or of difference in (effective) load between the carrier H and carrier L, e.g. a candidate device with the greatest path loss is selected, the priority of the candidate device may then be computed and evaluated. If the priority of the candidate device is not over a priority threshold, this candidate device may be excluded from being considered as a candidate for handoff, and a next candidate device, e.g., the next device with the second highest path loss, may be checked selected for handover. If none of the devices on the carrier H has a priority exceeding the priority threshold, no handover will be performed. The priority threshold may be adjustable by a service provider, and may be universal or different for different carrier H. In one embodiment, in case of absence of information required to compute a priority, a candidate device will be evaluated as though its priority exceeded a priority threshold, i.e., an arbitrary value P that exceeds the threshold may be assigned to the candidate device, and handoff of the candidate device may still yield significant performance gains on average even without the benefit of priority information.

In one embodiment, the priority threshold may be adjustable by a service provider, and may be specific to each carrier that may be considered as a carrier H. The purpose of the priority threshold is to increase the per-handover or per-device benefit of a move from a carrier H to a carrier L. For example, a device with the highest path loss may have absolutely no data waiting in its buffer. In this case, moving the device from a carrier H to a carrier L would have no effect in the next measurement interval since it would have placed no further load on the carrier L. In this example, the device may be assigned a low priority and excluded from consideration of handover. If a next candidate device, e.g., a device with the next highest path loss, to be considered for handover may have a significant amount of data waiting and therefore may be poised to place a heavy load on the carrier H in the next measurement interval, then this device may be assigned a high priority, and be selected as a candidate for handover to the carrier L.

In accordance with some embodiments, when a candidate mobile device for handover is selected, a handoff (or handover) of the candidate mobile device from a carrier H to a carrier L may be executed. After the handoff of the candidate device is executed, the values of PLmin and PLmax may be adjusted based upon the handover results. Given the potentially differing coverage characteristics between the carriers H and L (e.g., due to differing radio channel characteristics), it is possible that the handover does not succeed. If the handoff fails, the value of the upper bound PLmax may be reduced, and the node B proceeds to a next measurement interval repeating the embodiment methods described above. In one embodiment, if a current upper bound is already below a threshold, which may be set by a service provider on a per-carrier basis, the current upper bound is not adjusted and will remain unchanged. This strategy renders the selection criteria for a particular carrier pair L and H more conservative. That is, in light of failure of a handoff, a node B may only consider devices that are a little "closer in" to the node B the next time when a handover between the carrier pair of L and H is considered. If the handover succeeds, the value of the upper bound PLmax may be increased. In one embodiment, if the current upper bound is already above a threshold, which may be set by a service provider on a per-carrier basis, the current upper bound may not be adjusted and remain unchanged. If the current upper bound has never been adjusted, increasing the current upper bound may render the selection criteria for a particular carrier pair L and H more optimistic. That is, in light of success of a handoff, devices that are "farther out" from a node B may be considered the next time when a handover between the carrier pair of L and H is to be executed. If the current upper bound PLmax has been previously adjusted (e.g., reduced), the increase of the current upper bound may offset or compensate the reduction, preventing the PLmax from remaining at a reduced value or even possibly converging to an unrealistically low value through a series of uncompensated reductions.

The size (or step size) of the per-iteration (or per-handover) increase and decrease adjustments of the upper bound PLmax may be a parameter or value adjustable by a service provider, and may be specific to each carrier pair that may be used as a carrier H and a carrier L in the embodiments of the present disclosure. One of ordinary skill in the art would recognize many variations, alternatives and modifications for defining a "handoff failure". For example, a handoff failure may be a call drop resulting from the attempt to move the call from a carrier H to a carrier L. Alternatively, a handoff failure may represent an action of a common "fail-safe" or "veto" mechanism that refuses any inter-carrier handoff regardless of a trigger. For example, a node B may scan a target carrier and decide that its conditions are not sufficiently favorable to attempt the handover. In another embodiment, a handoff failure may more generally refer to any level of unexpected or undesired performance degradation associated with the handover. For example, a handoff failure occurs when a median value of a user equipment throughput does not increase as expected. Various definitions of a handoff failure may be used, depending upon a service provider's choice and its conservatism regarding inter-carrier handover attempts. All these variations are applicable within the embodiments of the present disclosure.

Statistically, a device associated with the worst path loss on a carrier consumes a disproportionately high fraction of that carrier's load resources, but may experience channel conditions that are not too dissimilar from those of other carriers at the device's position. The similarity arises because networks may be tuned so that each carrier has the same cell edge, i.e., coverage footprints are similar. A device with the highest path loss is likely to be in proximity to this edge. Removing such a device from a highly loaded carrier therefore frees up considerable load resources from (i.e., gives relief to) the highly loaded carrier. Moreover, placing the device on a least loaded carrier changes its channel conditions minimally (due to edge proximity) while allowing the device to access considerable untapped load resources. This combination of effects may favorably shift the statistical distribution of performance (e.g., throughput) across all users (i.e., users across all carriers). Specifically, 5%-ile to 50%-ile of the load distribution is improved at some marginal expense of 90%-ile. The tradeoff between performance and the marginal expense is advantageous, since 90%-ile of users are typically already quite satisfied, and accordingly, significant improvement of the lower percentiles (e.g., 5%, 50%) at slight degradation to this upper percentile is desirable for ensuring a generally satisfying experience across all users. The gains for "edge" users (5%-ile) are particularly important as these users typically are the most compromised in terms of performance. This improvement of performance is achieved through generally minimal device movement, which reduces the probability of any performance degradation associated with handover and thereby enhances service provider's desire to activate the feature embodied in the present disclosure, as well as through generally simple algorithms of device selection.

Figure 4:
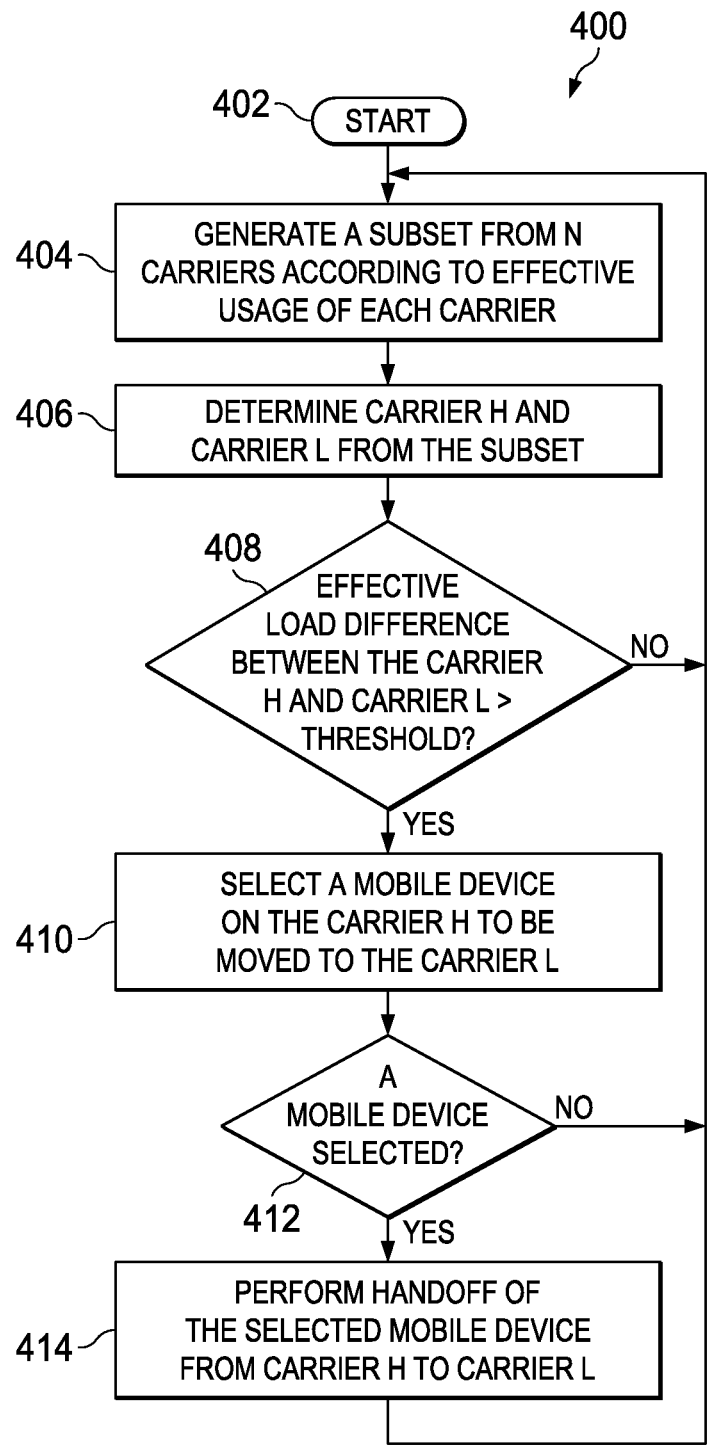
FIG. 4 illustrates a flow chart of an embodiment method for load rebalancing.

FIG. 4 illustrates a flow chart of an embodiment method 400 for load rebalancing by a node B communicating over N carriers. The method starts in Step 402 and proceeds to Step 404 where the node B generates or selects a subset of carriers from the N carriers according to effective usages for the N carriers. The subset of carriers includes a plurality of carriers with each having an effective usage greater than a threshold. As discussed above, an effective usage of a carrier at a measured usage may be obtained by adjusting the measured usage of the carrier with a factor that reflects impact of the measured usage (which is a carrier usage on the performance curve of the carrier) on the performance of the carrier. In one embodiment, an effective usage of a carrier at a measured load may be obtained by use of the Algorithm 1 described above. For example, a reference curve for the N carriers of the node B may be generated according to N performance curves of the N carriers, and then an effective usage of a carrier at a measured load may be obtained by locating a point on the reference curve that has the same performance as that corresponding to the measured load on the performance curve of the carrier. Other methods or algorithms for calculating or determining an effective usage for a carrier with a measured usage may also be applicable if the effective usage reflects the impact of carrier usages of the carrier on the performance of the carrier, or reflects the nonlinearity relationship between carrier performance and carrier usages.

The method 400 proceeds to Step 406 to determine a most heavily (or highly) loaded carrier (i.e., carrier H) and a most lightly loaded carrier (i.e., carrier L) within the subset of carriers, so that a mobile device from the most heavily loaded carrier may be moved to the most lightly loaded carrier to rebalance the load among the N carriers. A carrier with a highest effective usage may be selected as the most highly loaded carrier. The most lightly loaded carrier may be determined according to the Algorithm 2 described above, where adding an extra load to the most lightly loaded carrier may cause the least impact on the most lightly loaded carrier among the N carriers. Other variations for defining and determining the most heavily loaded carrier and the most lightly loaded carrier may be applicable without departing from the spirit of the present disclosure. When the most heavily loaded carrier and most lightly loaded carrier are determined, the method 400 may select a mobile device from the most highly loaded carrier as a candidate for handoff to move to the most lightly loaded carrier when a criteria is satisfied. In one embodiment, the method 400 may check whether the difference between the effective usage of the most heavily loaded carrier and the most lightly loaded carrier is greater than a threshold in Step 408. If the difference is less than the threshold, the method 400 goes back to the starting point in Step 402 and repeats the method of load rebalancing. If the difference between the effective usages of the most heavily loaded carrier and the most lightly loaded carrier exceeds the threshold, which satisfies the criteria, the method 400 proceeds to Step 410 to select a mobile device from the most highly loaded carrier to move to the most lightly loaded carrier. One of ordinary skill in the art would recognize many variations, alternative and modifications for setting the criteria. In accordance with some embodiments, selection of such a mobile device may be based upon evaluation of a function of device path loss and/or of difference in (effective) load between the most heavily loaded carrier and the most lightly loaded carrier. For example, one of the mobile devices hosted by the carrier H that has the greatest path loss to the host node B may be selected as a candidate device for move. As discussed above, the mobile device's path loss may be checked against a predetermined requirement, followed by calculation and evaluation of a priority value for this device, if its path loss satisfies the predetermined requirement. If the mobile device's priority also satisfies certain predetermined requirement, this mobile device is selected as a candidate for handover. In Step 412, if none of the mobile devices is selected as a candidate, the method 400 goes back to the starting point in Step 402. If a mobile device is selected, the method 400 performs handoff to move the selected candidate from the most highly loaded carrier to the most lightly loaded carrier in Step 414. After a successful handoff, the method 400 goes back to the starting point in Step 402.

Figure 5:
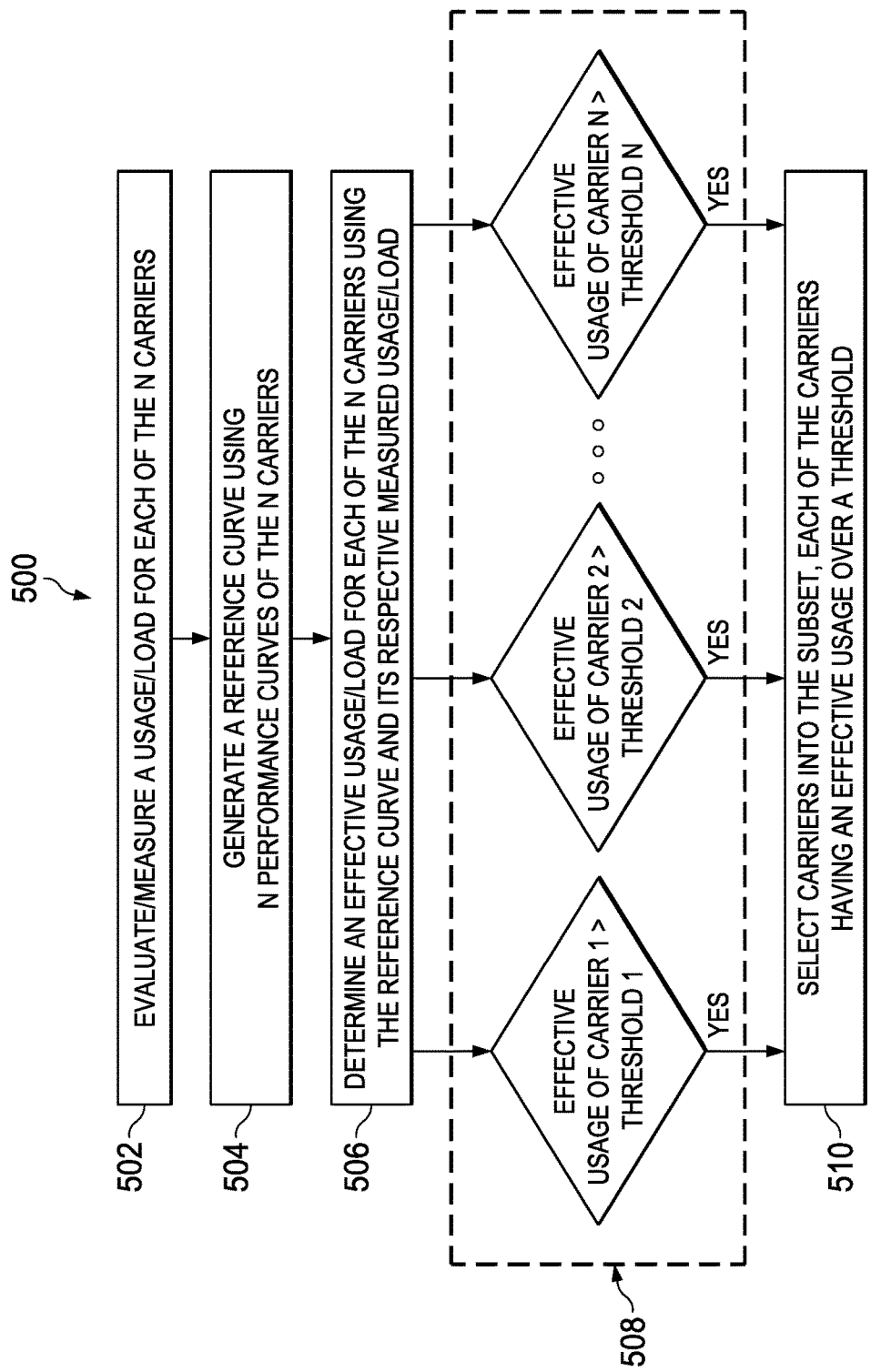
FIG. 5 illustrates a flow chart of an embodiment method for generating a subset of carriers from a plurality of carriers of a node B.

FIG. 5 illustrates a flow chart of an embodiment method 500 for selecting a subset of carriers from N carriers of a node B. The method 500 measures or evaluates a usage or load for each of the N carriers in Step 502. In Step 504, a reference curve is generated according performance curves of the N carriers. The method 500 then determines in Step 506 an effective usage for each of the N carriers according to the reference curve generated and the respective measured or evaluated usage of each of the N carriers. The method 500 may check the effective usage of each of the N carriers against a usage threshold to determine whether a carrier may be selected into the subset. For example, the method 500 may check whether the effective usage of carrier 1, carrier 2, . . . , and carrier N, respectively, is greater than a usage threshold 1, a usage threshold 2, . . . , and a usage threshold N in Step 508. If the effective usage of a carrier exceeds its corresponding usage threshold, this carrier is selected in the subset in Step 510. Otherwise, if the effective usage of a carrier does not exceed its corresponding usage threshold, the carrier is disregarded. As discussed above, the usage thresholds 1, 2, 3 . . . N may be the same or different from each other, which may be determined and adjusted by a service provider.

Figure 6:
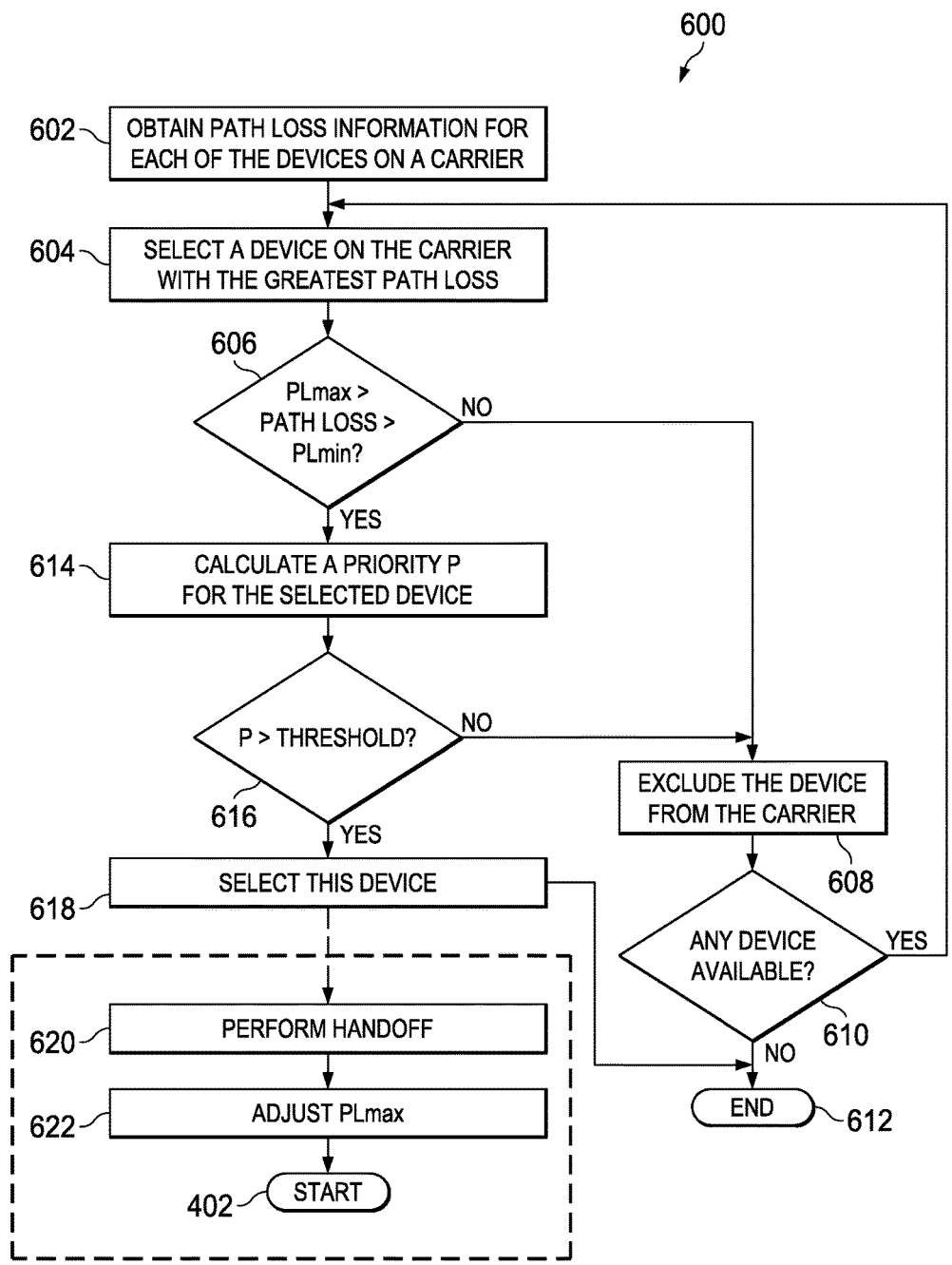
FIG. 6 illustrates a flow chart of an embodiment method for selecting for handoff a mobile device host by a carrier.

FIG. 6 illustrates a flow chart of an embodiment method 600 for selecting for handoff a mobile device host by a carrier, e.g., the most highly loaded (i.e., carrier H) as discussed above. In this embodiment, path loss is used for device selection. The method obtains in Step 602 path loss information for each of the mobile devices hosted by the carrier, and selects a mobile device with the greatest path loss as a candidate device for handoff in Step 604. The method 600 may check whether the path loss of the candidate device falls within a range defined by an upper bound PLmax and a lower bound PLmin. If the path loss of the candidate device does not fall within the range, the method 600 proceeds to Step 608 to exclude this device from being considered as a candidate device for handoff. The method 600 then goes to Step 610 to check whether there are any other mobile devices on the carrier that may be considered as a candidate for handoff. If there is still at least one mobile device left, the method 600 goes back to Step 604 to select another device on the carrier as a candidate with a second greatest path loss. If there is no mobile device left on the carrier for consideration, the method 600 ends in Step 612.

If the path loss of the candidate device falls within the range in Step 606, the method 600 may calculate a priority value for the selected candidate device in Step 614. As discussed above, the priority P of a device may be a function of one or more available parameters relevant to device history (past), device performance, device future (e.g., data to be transmitted by a mobile device), node B/sector performance, and network performance, and may be calculated accordingly. The calculated priority value for the candidate device may then be checked against a priority threshold in Step 616. If the calculated priority is not greater than the priority threshold, the method proceeds to Step 608 where this candidate device is excluded from being considered as a candidate. If the calculated priority is greater than the priority threshold, the method 600 proceeds to Step 618 where this device is selected, and the method 600 may end in Step 612. A handoff may be performed to move this selected candidate device from the carrier.

If the carrier in method 600 is a most highly loaded carrier as discussed in the embodiments of the present disclosure, and the candidate device is selected to handover from the most highly loaded carrier to a most lightly loaded carrier for load rebalancing, handoff of the candidate device may be executed after Step 618. As shown in FIG. 6, when a handoff of the candidate device is performed in Step 620, the upper bound PLmax may be adjusted in Step 622 based upon the handover results. In one embodiment, if the handoff fails, the value of the upper bound PLmax may be reduced, and if the handover succeeds, the value of the upper bound PLmax may be increased. In another embodiment, if the handoff fails, and the current value of the upper bound PLmax is greater than a first predetermined threshold, the value of the upper bound PLmax may be reduced; otherwise, the method 600 does not change the upper bound PLmax. If the handover succeeds and the current value of the upper bound PLmax is less than a second predetermined threshold, the value of the upper bound PLmax may be increased; otherwise, the method 600 does not change the upper bound PLmax. The method 600 may then proceed to a starting point 402 as illustrated in FIG. 4.

Figure 7:
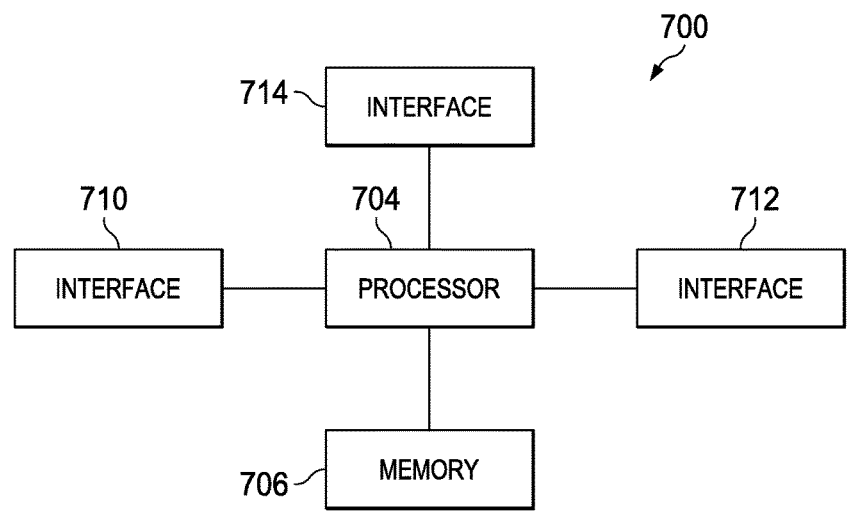
FIG. 7 illustrates a block diagram of an embodiment processing system.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
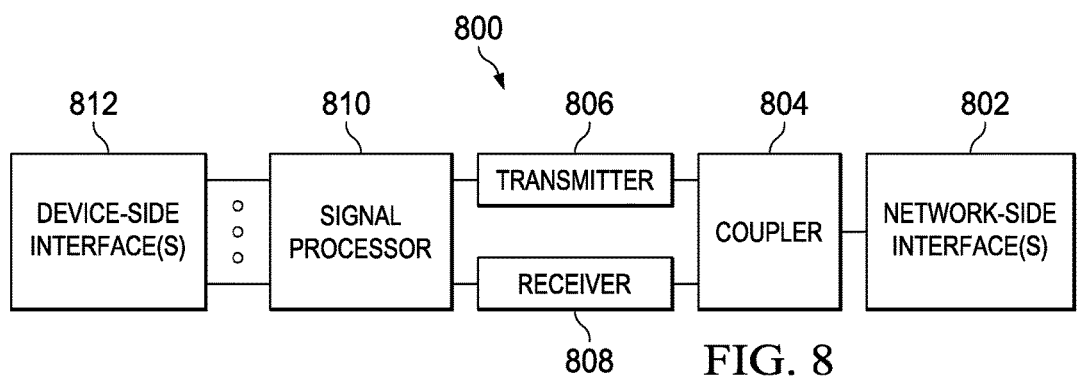
FIG. 8 illustrates a block diagram of an embodiment transceiver.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method, comprising:
    selecting, by a node B, a subset of carriers from a plurality of carriers of the node B according to effective usages of the plurality of carriers, the subset of carriers comprising at least two carriers, each of which has an effective usage greater than a usage threshold, wherein an effective usage of a respective carrier in the plurality of carriers is a usage of the respective carrier during a time interval, and is determined by adjusting a measured usage of the respective carrier during the time interval in accordance with carrier performance variations of the plurality of carriers with respect to a set of carrier usages;
    determining, by the node B, a heavily loaded carrier and a lightly loaded carrier from the subset of carriers according to effective usages for the subset of carriers;
    selecting, by the node B, a mobile device assigned to the heavily loaded carrier as a candidate for handoff when a criteria is satisfied; and
    performing, by the node B, a handoff of the selected mobile device from the heavily loaded carrier to the lightly loaded carrier; and
    wherein the method further comprises generating a set of reference performance values based on statistic performance data of the plurality of carriers, the set of reference performance values corresponding to the set of carrier usages, respectively; and
    wherein the effective usage of the respective carrier is determined by:
        obtaining the measured usage of the respective carrier;
        determining performance of the respective carrier at the measured usage based on statistic performance data of the respective carrier; and
        selecting a carrier usage from the set of carrier usages as the effective usage of the respective carrier, the selected carrier usage corresponding to a reference performance value that is the same as the determined performance of the respective carrier.

2. The method of claim 1, wherein generating the set of reference performance values comprises:
    generating a reference curve according to performance curves of the plurality of carriers, wherein a performance curve of a respective carrier in the plurality of carriers represents how carrier performance of the respective carrier varies with carrier usages, and the reference curve indicates carrier performance variations with the carrier usages, wherein each of the reference curve and the performance curves comprises a plurality of performance values corresponding to a plurality of usage values, and wherein each of the plurality of performance values of the reference curve corresponding to a usage value is determined by selecting the lowest performance value from the performance curves corresponding to the usage value; and
    wherein the effective usage of the respective carrier is determined according to the measured usage of the respective carrier in the plurality of carriers, the performance curve of the respective carrier and the reference curve, wherein the effective usage of the respective carrier has a usage value in the reference curve with a corresponding performance value that is determined based on the measured usage of the respective carrier on the performance curve of the respective carrier.

3. The method of claim 2, wherein generating the reference curve comprises generating a reference curve that satisfies $p_w(x) \leq p_i(x)$ for all x and i, wherein $p_i(x)$ is a performance curve of an $i^{th}$ carrier of the plurality of carriers, x represents carrier usages, and $p_w(x)$ is the reference curve.

4. The method of claim 3, wherein determining the effective usage for each of the plurality of carriers comprises determining an effective usage for each of the plurality of carriers according to $x_{i\mathit{eff}} = p_w^{-1}[p_i(x_i)]$, wherein $x_{i\mathit{eff}}$ is an effective usage of an $i^{th}$ carrier in the plurality of carriers with a measured usage $x_i$, $p_i(x)$ is a performance curve of the $i^{th}$ carrier of the plurality of carriers, x represents carrier usages, $x_i$ is a measured usage of the $i^{th}$ carrier in the plurality of carriers, $p_w^{-1}$ [ ] represents an inverse function of the reference curve $p_w(x)$.

5. The method of claim 2, wherein the effective usage of the respective carrier is determined by normalizing the measured usage of the respective carrier in the plurality of carriers to the reference curve.

6. The method of claim 1, wherein determining the heavily loaded carrier and the lightly loaded carrier from the subset of carriers comprises selecting, from the subset of carriers, a carrier that has the greatest effective usage as the heavily loaded carrier.

7. The method of claim 1, wherein determining the heavily loaded carrier and the lightly loaded carrier from the subset of carriers comprises selecting a carrier from the subset of carriers as the lightly loaded carrier whose carrier performance has a least degradation when a load is added to the carrier.

8. The method of claim 1, wherein the criteria is satisfied when a difference between an effective usage of the heavily loaded carrier and an effective usage of the lightly loaded carrier is greater than a threshold.

9. The method of claim 1, wherein selecting the mobile device assigned to the heavily loaded carrier as a candidate for handoff comprises selecting the mobile device according to path loss.

10. The method of claim 1, wherein selecting the mobile device assigned to the heavily loaded carrier as a candidate for handoff comprises selecting, from a plurality of mobile devices assigned to the heavily loaded carrier, the mobile device which has the greatest path loss among the plurality of mobile devices.

11. The method of claim 10, further comprising calculating a priority value for the selected mobile device when a path loss of the selected mobile device falls within a path loss range.

12. The method of claim 11, wherein the priority value is calculated according to one or more of a device history, device performance, data to be transmitted, node B performance, sector performance, and network performance.

13. The method of claim 12, wherein performing a handoff of the selected mobile device from the heavily loaded carrier to the lightly loaded carrier comprises performing a handoff of the selected mobile device from the heavily loaded carrier to the lightly loaded carrier when the calculated priority value of the selected mobile device is greater than a priority threshold.

14. The method of claim 2, wherein the effective usage of the respective carrier is determined by:
determining a performance value on the performance curve of the respective carrier that is corresponding to the measured usage of the respective carrier; and
determining a usage value on the reference curve that is corresponding to the performance value.

15. A node B, comprising:
a processor, and
a non-transitory computer readable storage medium storing programming for execution by the processor, the programming comprising instructions to:
select a subset of carriers from a plurality of carriers of the node B according to effective usages of the plurality of carriers, the subset of carriers comprising at least two carriers each of which has an effective usage greater than a usage threshold, wherein an effective usage of a respective carrier in the plurality of carriers represents a usage of the respective carrier during a time interval and is determined based on a measured usage of the respective carrier during the time interval according to performance of the plurality of carriers that varies with respect to a set of carrier usages;
determine a heavily loaded carrier and a lightly loaded carrier from the subset of carriers according to effective usages for the subset of carriers;
select a mobile device assigned to the heavily loaded carrier as a candidate for handoff when a criteria is satisfied; and
perform a handoff of the selected mobile device from the heavily loaded carrier to the lightly loaded carrier; and
wherein the programming comprises further instructions to generate a set of reference performance values based on statistic performance data of the plurality of carriers, the set of reference performance values corresponding to the set of carrier usages, respectively; and
wherein the effective usage of the respective carrier is determined by:
obtaining the measured usage of the respective carrier;
determining performance of the respective carrier at the measured usage based on statistic performance data of the respective carrier; and
selecting a carrier usage from the set of carrier usages as the effective usage of the respective carrier, the selected carrier usage corresponding to a reference performance value that is the same as the determined performance of the respective carrier.

16. The node B of claim 15, wherein the set of reference performance values is generated by:
generating a reference curve according to performance curves of the plurality of carriers, wherein a performance curve of a respective carrier in the plurality of carriers represents how carrier performance of the respective carrier varies with carrier usages, and the reference curve indicates carrier performance variations with the carrier usages, wherein each of the reference curve and the performance curve comprises a plurality of performance values corresponding to a plurality of usage values, and wherein each of the plurality of performance values of the reference curve corresponding to a usage value is determined by selecting the lowest performance value from the performance curves corresponding to the usage value; and
wherein the effective usage of the respective carrier is determined according to the measured usage of the respective carrier in the plurality of carriers, the performance curve of the respective carrier and the reference curve, wherein the effective usage of the respective carrier has a usage value in the reference curve with a corresponding performance value that is determined based on the measured usage of the respective carrier on the performance curve of the respective carrier.

17. The node B of claim 16, wherein an effective usage of the respective carrier is determined by normalizing the measured usage of the respective carrier in the plurality of carriers to the reference curve.

18. The node B of claim 15, wherein the criteria is satisfied when a difference between an effective usage of the heavily loaded carrier and an effective usage of the lightly loaded carrier is greater than a threshold.

19. The node B of claim 15, wherein the mobile device is selected as a candidate for handoff according to path loss.

20. The node B of claim 19, wherein the programming comprises further instructions to calculate a priority value for the selected mobile device when the path loss of the selected mobile device falls within a path loss range.

21. The node B of claim 20, wherein the handoff of the selected mobile device is performed when the calculated priority value of the selected mobile device is greater than a priority threshold.

* * * * *